Dec. 20, 1960 P. E. OBERG ET AL 2,964,832

FERROELECTRICS

Filed July 25, 1957

INVENTORS
PAUL E. OBERG
ROBERT W. OLMEN
WARREN J. GEIPEL
BY Cushman, Darby & Cushman
ATTORNEYS United States Patent Office 2,964,832

Patented Dec. 20, 1960

2,964,832

FERROELECTRICS

Paul E. Oberg, Falcon Heights, Robert W. Olmen, White Bear Lake, and Warren J. Geipel, Crystal, Minn., assignors to Sperry Rand Corporation, New York, N.Y., a corporation of Delaware Filed July 25, 1957, Ser. No. 674,229

14 Claims. (Cl. 29—25.35)

This invention relates to a method of changing certain properties of ferroelectric materials, and particularly, to permanently improving the hysteresis loop characteristic of ferroelectric monocrystalline materials or crystals.

A ferroelectric crystal is defined as one which when exposed to an alternating polarizing voltage exhibits a relationship between the electrostatic polarizing force and polarization in the direction thereof similar to the hysteresis loop exhibited by ferromagnetic materials. For the sake of convenience, this relationship has been termed, and will be herein referred to, as the "hysteresis loop" or "hysteresis loop characteristic" even though non-magnetic materials are being discussed.

Materials exhibiting a hysteresis loop which is substantially rectangular, indicating a low coercive force, a high remanent polarization and a high ratio between charge storing capacities at different points in the cycle are becoming increasingly useful in the electronic and computer art. The advent of large scale electronic digital computers has accelerated the need for compact and efficient bi-stable memory elements. For example, coincident current memories of the type currently used in large scale digital computers use magnetic bi-stable memory elements in great quantities. Although ferroelectric monocrystalline plates or ferroelectric crystals have also been used as bi-stable elements, they have not enjoyed the success accorded magnetic elements, mainly because their hysteresis loop characteristics were inferior to those of magnetic elements. That is to say, the degree of rectangularity of the hysteresis loops observed in the crystals was not as great as that found in the magnetic element. It is well known that the greater the rectangularity of a hysteresis loop, the better suited the material is for shifting its magnetic state.

The above mentioned desired characteristic for bistable elements are to be found not only in magnetic elements, but also in ferroelectric crystals treated in accordance with this invention.

Accordingly, it is the primary object of this invention to provide a method of permanently improving the hysteresis loop of a ferroelectric crystal.

Another object of this invention is to provide a method of permanently increasing the rectangularity of the hysteresis loop of a ferroelectric crystal so that the crystal will have enhanced switching properties.

Ferroelectric materials in and of themselves are not new, a few examples of which are as follows:

- Barium titanate,
- Rochelle salt,
- Ammonium-dihydrogen phosphate,
- Potassium dihydrogen phosphate,
- Potassium niobate, and
- Sodium niobate.

From among these ferroelectric materials, along with numerous others, barium titanate crystals inherently exhibit the best properties for use as a bi-stable element. However, the hysteresis loop characteristic of an untreated crystal of barium titanate is not sufficiently rectangular to be of great practical use in bi-stable circuits. By the process of this invention, the rectangularity of a hysteresis loop of ferroelectric crystals, is greatly improved, according a large decrease in the necessary switching time of such a crystal.

The process of this invention includes subjecting a ferroelectric material to a relatively high humidity atmosphere in the presence of an alternating electric field for a time sufficient to cause permanent improvement in the hystersis loop characteristic of the material. Preferably, the material is a barium titanate crystal, and more particularly such crystal is of a relatively uniform C-domain material. Such a crystal is a single one having a uniform alignment of domains, and the C-axis is that axis which is elongated below the Curie point providing a displacement of charge in a dipole moment. The process of this invention orients the domains along the C-axis.

Ferroelectric crystals with or without prior treatment affecting their hysteresis loop characteristic, may be improved by this inventon, and the improvement in either case is one of a permanent nature. Ferroelectric materials which have previously been annealed are most susceptive to having their hystersis loop characteristic increased in its rectangularity. It is therefore a feature of this invention to cause improvement in the hysteresis loop of a ferroelectric material first by annealing the material, and then by applying the aforementioned humidity process.

Accordingly, it is a further object of the present invention to improve permanently the hysteresis loop characteristic of a barium titanate crystal.

Another object of this invention in conjunction with the foregoing object is the permanent improvement of a barium titanate crystal which is of relatively uniform C-domain material.

A still further object of this invention is to provide a method of treating a feroelectric material by first annealing the material and then subjecting the material to a high humidity atmosphere in the presence of an alternating electric field for a time sufficient to cause a permanent increase of a high degree of rectangularity of the hysteresis loop characteristic of the material.

Still other objects of this invention will become apparent to those of ordinary skill in the art of reference to the following detailed description of the exemplary embodiments of the invention and the appended claims. The various features of the exemplary embodiments according to the invention may best be understood with reference to the accompanying drawings, wherein:

Figure 6:
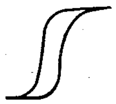
Figure 7:
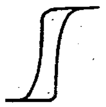
Figure 5:
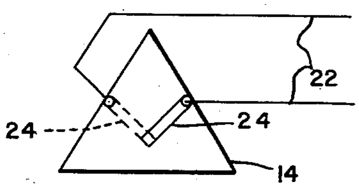
Figure 4:
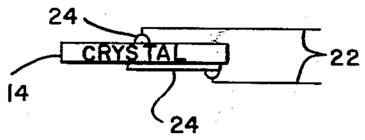
Figure 3:
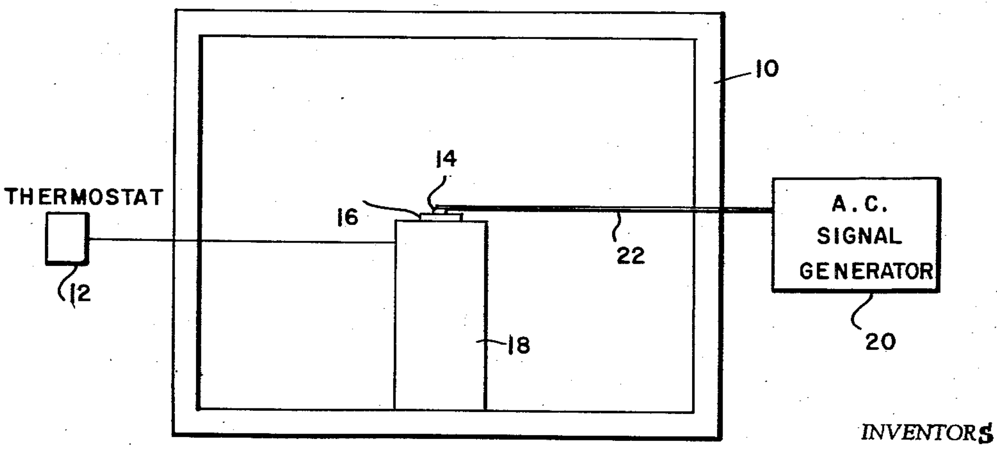

Figure 3 diagrammatically illustrates apparatus for accomplishing the humidity treatment of this invention;

Figure 4 is an elevational view of the crystal and its leads;

Figure 5 is a plan view of the crystal and its leads;

Figure 6 is a representation of the hysteresis loop characteristic of a ferroelectric material after being annealed, and Figure 7 represents the increase in rectangularity of the hysteresis loop of an annealed ferroelectric material after subjection to the humidity treatment feature of this invention.

Although there are numerous types of ferroelectric crystals, the following descriptive portion of this specification refers to barium titanate crystals as the preferred type since, as is well known, such crystals exhibit, because of their inherent tendencies, the most desirable properties for use as a bi-stable element.

It has been discovered that both reversible and irreversible changes occur in the hysteresis loop characteristics of barium titanate crystals when they are subjected to high humidity conditions during the simultaneous application of an alternating electric field for a relatively short time. For example, the hysteresis loop of a barium titanate crystal energized and under the influence of 100% humidity conditions for a short time, undergoes a reversible change, i.e., its hysteresis loop takes on a greater rectangularity characteristic so long as the crystal is subjected to a humidity atmosphere, but reverts back to its original form when the crystal is allowed to dry out. Indeed, even breathing on a barium titanate crystal will cause change in its hysteresis loop, but such change is only temporary. As reported on page 1387 of the November, 1955 issue of the Journal of Applied Physics, crystals subjected to humidity treatment for even up to about 45 minutes still revert to their prior hysteresis loop characteristic. During such "short time," high humidity, electric field conditioning process, the saturation polarization of a crystal increases and the coercive field decreases, yielding a hysteresis loop with approximately the same area, but with great "squareness," i.e., the rectangularity of the loop is improved. A crystal which has no history of prior treatment such as annealing, has a hysteresis loop characteristic similar to that shown in Figure 1. The effect of the short time process just referred to is to cause a change in the hysteresis loop of Figure 1 to a loop similar to that shown in Figure 2. However, it is to be emphasized that whatever improvement is noted by such a short time process, that it is not a permanent improvement in any sense of the word.

The above described effects have been observed in crystals from 0.001 inch to 0.012 inch. The amount of change in the hysteresis loop for a given crystal depends, inter alia, upon the crystal structure, thickness and history of prior treatment. In general, the change is more pronounced in thick crystals which have previously and successfully been heat treated in an alternating electric field, and/or which are of relatively uniform C-domain material.

The reversible changes in the hysteresis loop characteristic when a crystal is subjected to humidity and electric field treatment for only a short time, is believed to be due to the effects of water vapor adsorbed on the surface of the crystal while it is in an atmosphere of 100% relative humidity. For one thing, it is well known that water vapor on the surface of a dielectric material is ionized. There are several possible mechanisms which have been considered in order to explain how this conductive layer of water vapor produces the observed changes in hysteresis loops of crystals. However, it is not yet known whether improved electronic contacts, increased effective electrode area, or increased nucleation and/or velocity propagation of domains of reversed polarization is/are primarily responsible for the reversible effects of high humidity on the crystals. Any or none of these factors may be responsible for the reversible effects.

It is manifest that such a temporary improvement in the fundamental properties of a ferroelectric crystal is of no practical significance, since the improved rectangularity of the hysteresis loop reverts to normal very readily precluding any advantageous bistable effect. For such applications as those mentioned above, any improvement in the hysteresis loop characteristic must be of a permanent nature. By this invention such a result is possible, for it has been found that if a ferroelectric crystal is energized by means of an alternating electric field while in a high humidity atmosphere for a time greater than 45 minutes, the ferroelectric properties are permanently changed. Manifestations of this change are apparent, not only in the greater rectangularity of the resulting hysteresis loop characteristic, but also in the refusal of a crystal improved in such a manner to change to any noticeable degree towards its former hysteresis loop characteristic, even by energizing the crystal after many months for a period of a week in a desiccator or vacuum chamber providing an atmosphere of nearly zero humidity.

Figure 1:
Fig. 1 represents a hysteresis loop characteristic of an untreated ferroelectric material.
Figure 2:
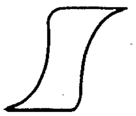
Figure 2 illustrates the resulting hyseresis loop characteristic which may be accomplished by this invention.

Figures 1 and 2 also serve to illustrate how the hysteresis loop characteristic of a ferroelectric crystal may be permanently changed when treated for a comparatively "long time" (i.e., for more than 45 minutes) in accordance with this invention. As before mentioned, Figure 1 illustrates a hysteresis loop taken from an untreated ferroelectric crystal. Some of the characteristics of the loop in Figure 1 are rounded corners, a quasi-elliptical shape and no significant degree of rectangularity.

On the other hand, the loop shown in Figure 2, taken from a ferroelectric crystal which has been treated in accordance with the method of this invention, is characterized by a high degree of rectangularity, and such a characteristic obtains permanently, i.e., is not reversible to any degree.

The mechanism of such an irreversible improvement in the hysteresis loop characteristic of a ferroelectric crystal treated in accordance with this invention is also not known. Without any limitation intended, the following comments are made concerning the irreversible improvement process. It appears that crystal strains can be relieved by the treatment of this invention much the same as by heat treatment in an electric field. The optical change in the crystals during water vapor treatment is a growth of black area as observed through crossed Nicol prisms. This occurs at the expense of adjacent strained or unfavorable oriented regions. The change has frequently been observed at some distance from the electrode connected to the crystal, as hereinafter explained, as though the increased effective electrode area were playing an important part just as it does in heat treatment with physically larger electrodes.

The increased surface conductivity, which enhances sideways propagation of domains of reversed polarization and increases the effective electrode area may have the same effect, over an extended period of time, as does heat treatment. However, since, as will later be fully explained, a previously heat treated crystal may still have its hysteresis loop characteristic permanently improved by the water vapor treatment of this invention, there is an indication that some other factor or factors may also be operative in causing the permanency resulting from an application of this invention. It might be observed that it is conceivable that a treatment in accordance with this invention alters the surface state of the molecules of a ferro-electric crystal by the formation of hydrates or other compounds, and thereby reduces the minimum field for nucleation of new domains of reverse polarization. Regardless of the reasons for the permanent improvement, it is an established fact that such improvement does occur when the comparatively long time humidity-electric field process of this invention is employed.

No particular apparatus need be used to perform the method of this invention, but exemplary apparatus is now described to aid in the understanding of the complete method. Such apparatus is shown in Figure 3 and comprises chamber 10 with suitable means (not shown) for controlling the relative humidity in the chamber. A thermostatic control 12 is diagrammatically shown and connected internally of the chamber to regulate the temperature of the crystal 14 disposed on a suitable subtrate 16 which may be perched atop a larger and generally supporting means 18.

Energizing means for exciting the crystal 14 is provided by an alternating current signal generator 20 of the audio oscillator type, for example. Leads 22 connect the excitation means 20 with the crystal 14 in a manner best seen in Figures 4 and 5. Preferably, crystal 14 is provided with evaporated noble metal electrodes 24 (e.g., gold) so arranged as to form a ferroelectric capacitor of small volume to be readily connected to the signal generator leads 22. Electrodes 24 may be 0.003 to 0.006 inch wide, for example, and are disposed over the good C-axes areas as determined by optical observation.

Although the crystal 14 is shown as being triangular in form in Figure 5, no limitation to such configuration is intended since any shape of crystal may be employed as long as a capacitive effect is obtained when current on leads 22 is applied across the crystal, preferably in the thickness direction.

In carrying out the invention by the apparatus illustrated in Figure 3, the crystal 14 is connected to leads 22 and placed within the humidity chamber 10 upon subtrate 18. A high humidity atmosphere is then caused in the chamber and the signal generator is energized to cause excitation of the crystal. A crystal is allowed to remain under these conditions for a period greater than 45 minutes.

It has been determined that the frequency and strength of the alternating signal issuing from generator 20 for the purpose of exciting crystal 14, may be of any suitable values desired. The strength of the electric field must, of course, be sufficient to shift the crystal between its two states. That is, the signal must have an amplitude which will cause the crystal to repeatedly charge and recharge. A typical coercive electric field for a barium titanate crystal is in the neighborhood of 1000 volts per centimeter.

The process of this invention is substantially independent of the frequency of the alternating signal from generator 20, any frequency up to the resonant frequency of crystal 14 being excited is quite satisfactory. Experiments were successfully conducted on a barium titanate crystal with a variation in frequency between 60 and 1200 cycles per second without any noticeable effect due to frequency variations. Limitation to such a frequency range is not intended, however, since it is known that crystals will switch at least every 0.2 microsecond which means that the excitation frequency may be in the megacycle region as long as it is less than the resonant frequency. At higher frequencies, however, the crystals have a tendency to heat up and get into a piezoelectric state.

The temperature of the high humidity atmosphere in chamber 10 may have any value varying between the freezing point of water (0° C.) and the Curie point for the particular ferroelectric crystal being treated. Preferably, the temperature within the chamber is maintained at a room temperature of approximately 20° C. At all times during the treatment, the atmosphere is at least substantially saturated with water vapor, and preferably has a relative humidity of 100%.

As previously mentioned the time duration of the humidity-electric field process in accordance with this invention is at least greater than 45 minutes. The exact time to cause permanent improvement with the crystal being processed, and times of two or four hours, more or less, may be necessary. After an irreversible change has set in, however, further improvement in the hysteresis loow characteristic, or in the permanency thereof, is not obtained by continued treatment.

The thickness of the crystal does not affect the process or the resulting improvement as long as the electric field applied thereto is sufficient to switch the dipole moment in a "C" axis. The repolarization energy of a ferroelectric capacitor can be made small if the volume contained between the electrodes is minimized, since a thin crystal requires a low driving voltage and the total surface charge is proportional to the electrode area. Thin crystals are more likely to possess better rectangular hysteresis loops than thin ones. However, there seems to be a lower limit for electrode area below which the hysteresis loops become sheared. For a barium titanate crystal 0.005 cm. thick, this limiting area is about $5\times10^{-5}$ cm.$^2$.

The degree of improvement depends on the prior characteristics of a crystal. Two crystals, for example, one with a loop like Figure 1, and the second with slightly more rectangularity, when subjected to identical treatment in accordance with this invention, will exhibit differing degrees of improvement with the second being improved a greater percent than the first. Thus, a crystal having a substantial number of pre-oriented domains is improved to a greater degree than a crystal with a few properly oriented domains.

As has been previously indicated, the foregoing described comparatively long time humidity-excitation process, may be employed to improve permanently the hysteresis loop characteristic not only of previously untreated crystals, but also of crystals which have an annealing history. The latter is true particularly of ferroelectric crystals which have been annealed, in the same or a different chamber, by heating the crystals above their Curie point and cooling them prior to the humidity treatment with the cooling occurring in the presence of an alternating electric field applied at least above and during the re-cross of the Curie point, and preferably during the full cooling period. Preferably, the cooling process is controlled so that cooling takes place slowly down to room temperature, for example, at 2° C. per minute or slower, the mentioned rate being a good figure of merit for the fastest allowable cooling rate. At a faster rate a crystal may fracture or have stresses introduced in it sufficient to ruin the arranged dipole moments and thus prevent a predictable improvement or actually cause a degradation of the hysteresis characteristic.

For such an annealing treatment, noble metal electrodes are also preferably employed, but they are not necessarily the same ones used during the humidity treatment. The electrodes used in the annealing treatment preferably cover the majority of the crystal face surfaces, respectively. The large electrodes may be removed after the cooling process by dissolving them in aqua regia after which the aforesaid narrow electrodes are deposited on the crystal.

After an annealing treatment, and before the subsequent comparatively long time humidity excitation treatment, a crystal will exhibit a hysteresis loop characteristic similar to that illustrated in Figure 6. The loop in Figure 6, compared to the loop in Figure 1 for a totally untreated crystal, has a high degree of rectangularity. However, after treatment for two hours or so in a 100% relative humidity atmosphere during excitation of the annealed crystal, the rectangularity of the hysteresis loop characteristic for the crystal is improved even more so, as may be noted by Figure 7 which illustrates the resulting characteristic. Again, the improved rectangularity of the crystal is of a permanent nature, there being no reversion to the hysteresis loop characteristic obtaining for the crystal after or before its annealing.

The alternating electric field which provides excitation for a ferroelectric crystal subjected to the foregoing described annealing process may have a frequency and strength comparable to the field employed during the humidity treatment. However, limitation thereto is not intended, and there is no necessity for the two fields to be from the same source. In fact, the field for the annealing process is subject only to the limitations set out above for the field employed during the humidity treatment. That is, the strength may have any value so long as it is sufficient to shift the crystal between its two states, and the frequency may have any value up to the resonant frequency of the crystal being annealed.

Thus it is apparent that there is provided by this invention, methods in which the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. A method of changing the properties of a ferroelectric crystal having secured on opposite sides thereof electrodes which respectively cover substantially less area than said sides, including subjecting said crystal to a high humidity atmosphere in the presence of an alternating electric field connected via said electrodes and having a frequency less than the resonant frequency of said crystal, all for a time sufficient to provide permanent improvement in the hysteresis loop characteristic of said crystal.

2. A method as in claim 1 wherein said atmosphere is at least substantially saturated.

3. A method as in claim 1 wherein said atmosphere has a relative humidity of 100%.

4. A method as in claim 1 wherein said electric field is applied across the thickness of said material, said electrodes being disposed over two C-axes of said material.

5. A method as in claim 1 wherein the ferroelectric material is subjected to said atmosphere and field for a period of time at least exceeding 45 minutes.

6. A method as in claim 1 wherein the temperature of said atmosphere is less than the Curie point of said material.

7. A method as in claim 6 wherein said temperature is approximately 20° C.

8. A method as in claim 1 and further including heating said ferroelectric material before said subjecting.

9. A method as in claim 8 wherein said material is heated above the Curie point thereof.

10. A method as in claim 9 and further including cooling said material after heating thereof and before said subjecting, the cooling occurring in the presence of an alternating electric field at least while the material recrosses said Curie point.

11. A method as in claim 10 wherein said material is cooled at a rate of approximately 2° C. per minute.

12. A method as in claim 10 wherein said material is cooled at a rate slower than approximately 2° C. per minute.

13. A method of increasing the rectangularity of the hysteresis loop characteristic of a ferroelectric material having secured on opposite sides thereof electrodes which respectively cover substantially less area than said sides, including applying across said electrode an alternating electric field of frequency less than the resonant frequency of the material while in the presence of a high humidity atmosphere having a temperature less than the Curie point of said material and more than 0° C. for a time sufficient to provide permanent improvement in the rectangularity of said hysteresis loop characteristic.

14. A method of increasing the rectangularity of the hysteresis loop characteristic of a ferroelectric material including the steps of heating then cooling said material, applying across said material an alternating electric field of frequency less than the resonant frequency of said material while cooling the material, affixing electrodes on opposite sides of said material, and applying to said crystal via said electrodes a second alternating field of frequency less than the resonant frequency of said material while in the presence of a high humidity atmosphere having a temperature less than the Curie point of said material and more than 0° C. for a time sufficient to provide permanent improvement in the rectangularity of said hysteresis loop characteristic.

References Cited in the file of this patent

UNITED STATES PATENTS

| | | |
|---|---|---|
| 2,384,541 | Fruth | Sept. 11, 1945 |
| 2,614,144 | Howatt | Oct. 14, 1952 |
| 2,618,698 | Janssen | Nov. 18, 1952 |
| 2,777,188 | Remeika | Jan. 15, 1957 |